May 3, 1955     W. HORTH     2,707,314
METHOD OF RECLAIMING GRANULAR MATERIAL
Filed Oct. 23, 1951     2 Sheets-Sheet 2
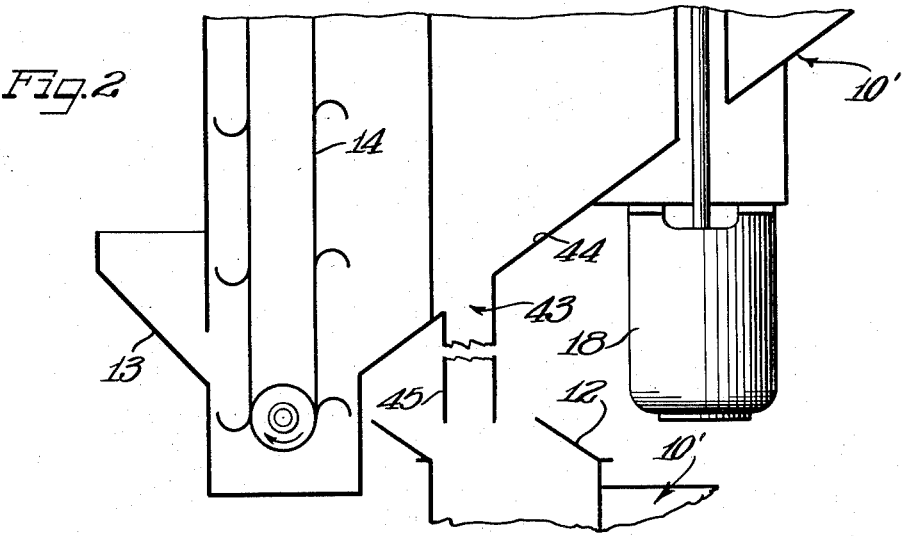
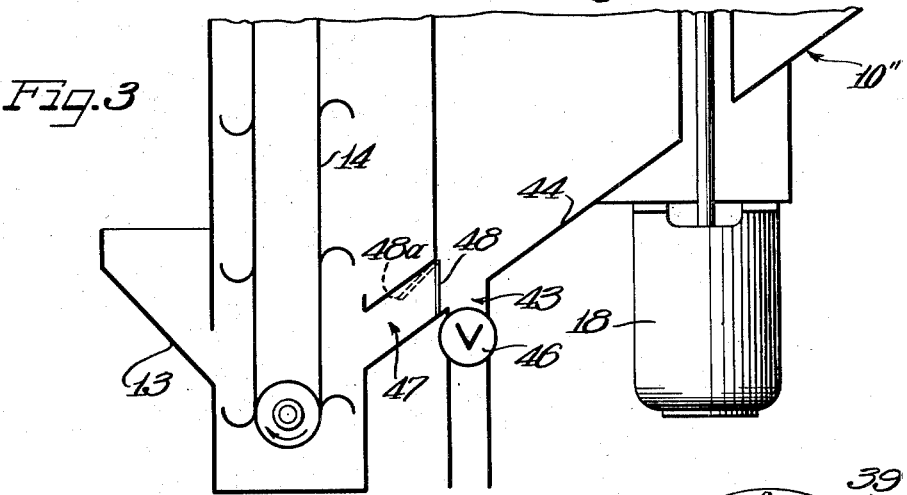
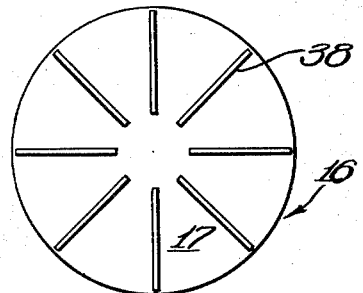
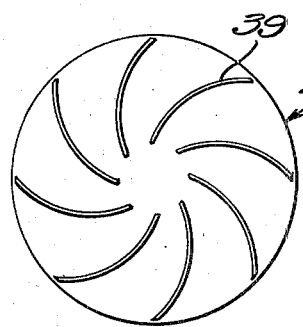
Inventor:
Walter Horth

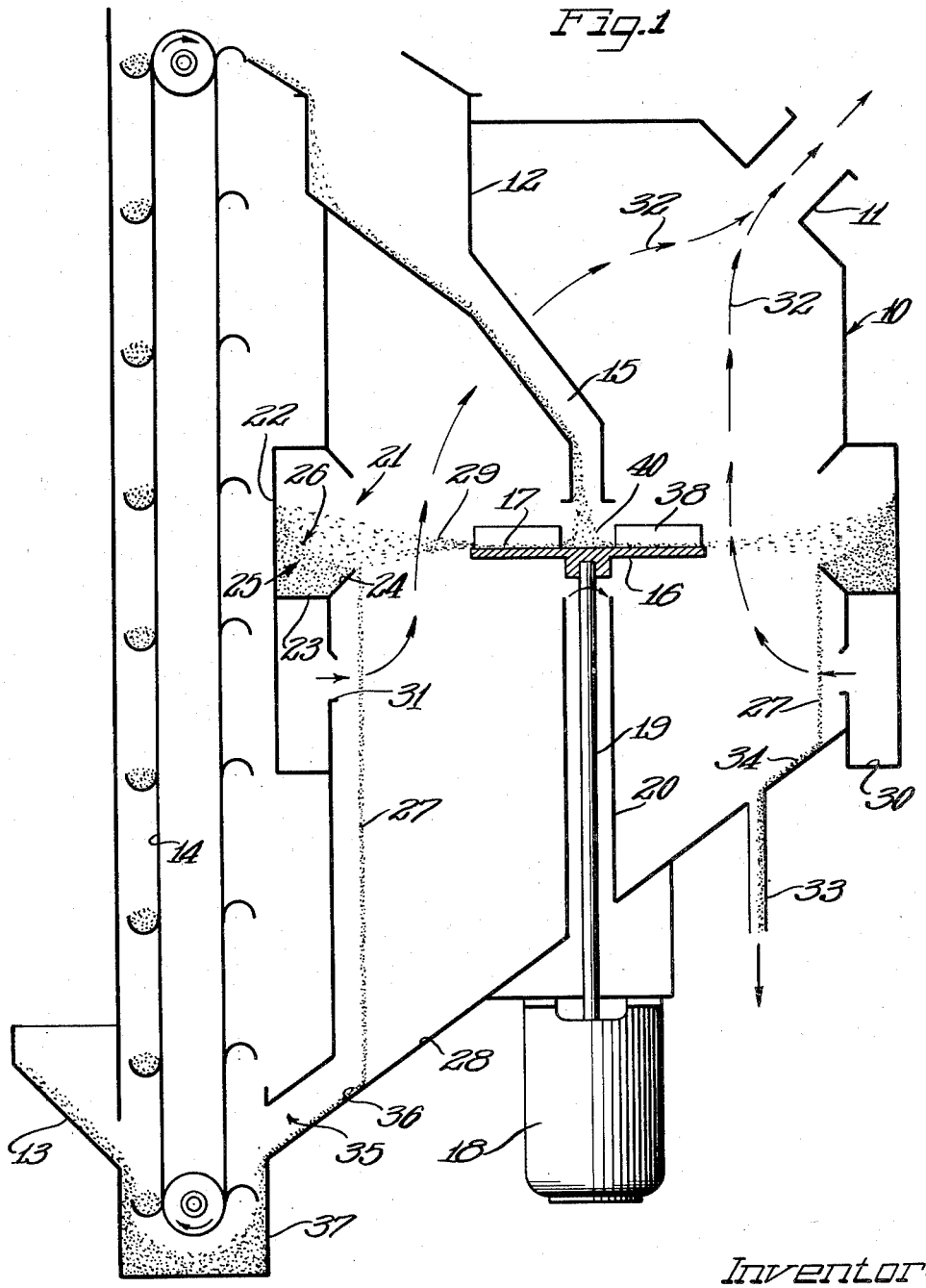

United States Patent Office 2,707,314
Patented May 3, 1955

2,707,314

METHOD OF RECLAIMING GRANULAR MATERIAL

Walter Horth, Wilmette, Ill., assignor, by mesne assignments, to Herbert Simpson Corporation, Chicago, Ill., a corporation of Illinois Application October 23, 1951, Serial No. 252,786

1 Claim. (Cl. 22—217)

The present invention relates to an apparatus for and method of reclaiming granular material. More particularly, the present invention relates to an apparatus for and method of scrubbing molding sand to remove a coating thereon.

Used foundry molding sand generally contains silica sand particles admixed with binding material and carbonaceous materials, such as seacoal, pitch, and cereals, together with basically non-carbonaceous materials, such as clays, bentonites and silica flour. Thus, in order to reclaim the sand after use, it is necessary to remove both the carbonaceous materials and the non-carbonaceous materials. In a conventional reclaiming process, the first stage usually involves the removal of carbonaceous materials by oxidation, as by subjecting the used sand to blasts of heated air, or otherwise subjecting the sand to a furnace atmosphere. The carbonaceous materials are thus removed, but the non-carbonaceous materials remain in the form of an envelope, or coating, which encloses each individual sand particle or group of sand particles.

The present invention relates to an improved apparatus and method for the removal of non-carbonaceous materials from decarbonized sand by a literal "scrubbing" of the envelope of foreign material from the enclosed granular particles.

It is, therefore, an important object of the present invention to provide an improved method and means for the removal of foreign matter from molding sand including means for directing a stream of material at high velocity against other material traveling at a relatively low velocity or stationary for scrubbing the impacting material.

A further important object of the present invention is the provision of a method and means for the removal of foreign matter from molding sand which includes the steps of establishing a high velocity stream of material into a scrubbing area, momentarily retaining material in the scrubbing area for scrubbing contact with said stream, delivering scrubbed material and foreign matter which has been scrubbed off from the scrubbing area by gravity, and trapping the foreign matter in a countergravity air stream and directing the countergravity air stream and entrapped foreign matter through said high velocity stream of material to effect an initial scouring of the granular material.

An important object of the present invention resides in the utilization of a flinger member having a generally flat surface for receiving granular material and imparting thereto an angular acceleration to set up a centrifugal stream emanating from said member in combination with a target serving to retain some of the material adjacent thereto for scrubbing impact with material of the centrifugal stream subsequently emanating from said member.

It is, therefore, a further important object of the present invention to provide an improved method and means which includes establishing a centrifugal high-velocity stream of material emanating from a central position and impinging on a target, retaining some of the material adjacent the target sufficiently long to be subjected to a scrubbing impact by subsequent material impinging thereon, delivering scrubbed material and foreign coating matter from the target by gravity and entrapping the falling coating matter in an air stream and directing the air stream upwardly through the centrifugal stream of material for initial scouring of the material.

Still another object of the present invention is to provide a flinger member mounted for rapid rotation, means delivering material centrally of said member for angular acceleration by said member to set up a centrifugal stream emanating from said member, and means in the path of said stream for retaining the material delivered thereto by the stream momentarily in the path of the stream for scrubbing by material subsequently emanating from said flinger member.

An important feature of the present invention is the provision for recycling material for further scrubbing.

Still another important feature of the present invention is the provision of means for discharging from the apparatus an amount of material proportionate to the amount of material delivered to the scrubbing apparatus.

Yet another important feature of the present invention is the provision of a modified apparatus and method whereby a pair of scrubbing chambers are arranged in tandem, with means being provided for the continuous gravity flow of said particles from one chamber to another, if desired, to insure an adequate scrubbing and cooling action.

It is an additional object of the present invention to provide a novel flinger member.

Other and further important objects and features of this invention will be apparent from the disclosures in the specification and the accompanying drawings, in which:

Figure 1 is a schematic illustration of an apparatus according to the present invention and which may be utilized for carrying out the method of the present invention;

Figure 2 is a fragmental schematic representation of a modified form of apparatus which is adapted for carrying out a modified method;

Figure 3 is a fragmental schematic representation of a further modified form of apparatus which is adapted for carrying out a further modified form of the method of the present invention;

Figure 4 is a plan view of one type of flinger member according to the present invention; and Figure 5 is a plan view of a modified form of flinger member according to the present invention.

In Fig. 1 reference numeral 10 refers to a generally cylindrical vessel having at the top a discharge passage 11 and a delivery hopper 12.

Material is delivered to the vessel by means of a hopper 13 and upstanding bucket conveyor schematically illustrated at 14. The bucket conveyor raises material from the hopper 13 to deliver it into the hopper 12 from which it flows through a conduit 15 to a central position in the vessel. At the central position in the vessel intermediate the top and bottom ends threeof, is a flinger or flinger member 16 which has a flat upper surface 17 adapted to receive material from the delivery conduit 15 centrally thereof. In order to impart to the particles a high angular velocity, the flinger is rotated at high speed by means of a motor 18 mounted below and centrally of the vessel and a shaft 19 extending upwardly through the bottom of the vessel within a cylindrical housing 20.

The rotation of the flinger sets up a high velocity stream of material emanating from the flinger and impinging on a scrubbing chamber indicated generally by the reference numeral 21 which extends around the transverse perimeter of the vessel in spaced surrounding relation to the finger. The chamber or target is so designed as to momentarily retain particles impinging therein so as to be scrubbed by subsequent particles in the stream emanating from said flinger.

While in my copending application entitled "Apparatus For and Method of Reclaiming Granular Material," Serial No. 216,163, filed March 17, 1951, I have also illustrated a method and apparatus wherein material is momentarily retained adjacent a target for scrubbing impact with subsequent particles in a stream of material, in my copending application the velocity was imparted to the stream of material by means of air under pressure. In the present application, the velocity is imparted to the particles by means of an angular acceleration to set up a centrifugal stream of material without the assistance of air under pressure.

Broadly, the invention contemplates establishing a bank of material and impelling material at high velocity against said bank for scrubbing impact with the material of said bank. In the apparatus illustrated in Fig. 1, the bank of sand is established by means of a cup-shaped surface including an inwardly facing surface 22 and an upwardly facing surface 23 extending around the perimeter of the vessel. If desired an upwardly sloping surface 24 may be provided to more conveniently retain material in the scrubbing chamber for contact with subsequent material emanating from said flinger. As indicated diagrammatically in Fig. 1, after the apparatus has been in operation for a time, a bank of sand indicated by the reference numeral 25 is built up in the pockets provided by the surfaces 22, 23, 24 of the scrubbing chamber. As material impinges upon this bank, it is momentarily retained on the sloping surface generally indicated by the reference numeral 26 for scrubbing by subsequent particles in the centrifugal stream.

As indicated by the reference numeral 27, this material after it has been scrubbed will more or less gradually flow downwardly along the sloping sand bank surface 26 and over the inner end of the surface 24 to fall to the sloping bottom 28 of the vessel. In order to remove scrubbed-off foreign matter from the scrubbed material, an air stream is set up around the perimeter of the vessel through the falling stream of scrubbed material 27 and through the centrifugal high velocity stream indicated by the reference numeral 29. This air stream also has the effect of partially cooling the material. In order to set up the air stream, an air pressure manifold or bustle is provided around the transverse perimeter of the vessel as indicated at 30. Air under pressure flows through the openings 31 into the vessel beneath the scrubbing chamber and upwardly through the centrifugal stream 29 and out the discharge opening 11. The air stream, the direction of which is indicated schematically by the arrows 32, is, of course, insufficient to entrap the scrubbed sand particles. The air exhausted through the discharge opening 11 is preferably passed through a dust arrester (not shown) for the separation of fine clays, bentonite, and silica particles removed from the sand particles.

According to the embodiment of the invention shown in Fig. 1, the sloping bottom wall 28 is provided with a discharge port 33 which may subtend the desired sector of the scrubbed material indicated by the reference numeral 34 flowing towards the recirculation port 35 at the lowermost point of the sloping bottom. Thus a small amount of sand, proportional to the amount fed into the charging chute of the bucket elevator, is allowed to escape to the discharge port 33. The stream of scrubbed sand which is not intercepted by the discharge port 33 such as that indicated by the reference numeral 36 flows through the recirculation port 35 and into the bucket conveyor trough 37 to be picked up by the bucket and redelivered to the charging chute 12.

The operation of the embodiment of Fig. 1 is therefore preferably as follows. The sand is fed at a uniform rate into the charging chute 13 of the bucket elevator 14. The bucket elevator raises the material to the feed chute 12, from whence it flows into the center of the flinger disk 16. The flinger disk may be equipped with radial or curved vanes 38 or 39, respectively, Figs. 4 or 5, projecting outwardly at right angles from the upper surface 17 of the disk. With the flinger disk rotating about a longitudinal axis at high velocity, material fed from the conduit 15 to the central portion of the disk 16 as indicated by the reference numeral 40 is angularly accelerated to give the particles between the vanes a high centrifugal and tangential velocity which causes the sand to move outwardly from the central portion of the disk to provide a stream of material streaming against the sand bank 25 substantially uniformly about the circumference thereof. The sand will always impinge upon sand, resulting in a scrubbing action.

The sand particles charged into the vessel 10 are typically coated with non-carbonaceous material which forms an envelope enclosing each individual sand particle, or groups of particles, and this envelope is split and/or ruptured by abrasive contact of sand particles in the sand bank with the sand particles in the centrifugal stream 29. The sand bank 25 thus serves as a target which tends to momentarily retain the sand particles impinging thereon in the vicinity of the target for impact with particles subsequently emanating from the flinger 16. In this manner, an effective and violent scrubbing action is exerted upon the sand particles, and after a plurality of passes against the target 25, the sand is relatively free of non-carbonaceous materials or other foreign contaminating matter associated with the sand particles. The non-carbonaceous materials, such as fine clays, bentonite and silica particles which are removed or scrubbed from the sand, are in finely divided form and are relatively less dense than the sand itself.

The sand and scrubbed-off materials (such as clay, material binders, carbon, etc.) falls over the overflow lip 24 of the scrubbing chamber 21 and in so doing passes the annular opening 31 through which the air is blown. The air stream 32 is of sufficient velocity to entrap the contaminating materials which have been scrubbed off the sand grains. The air, including these dusty materials, is exhausted through the top of the reclamation unit through the discharge opening 11. It will be noted that these dusty materials have to pass through the horizontal sand stream 29 which is emitted from the flinger disk 16. In doing this, the materials collide with the sand to be scrubbed and thus effect primary scouring.

While the larger amount of the sand returns to the boot 37 of the bucket elevator 14 via the sloped bottom 28 of the reclamation unit, a small amount of sand, proportional to the amount charged into the charging chute 13 of the bucket elevator, is allowed to escape through the discharge opening 33.

It will be observed that the radial vanes 38 of the flinger disk 16 shown in Fig. 4 tend to impel the particles somewhat forwardly of the departure point of the particles from the disk, while the disk 41 shown in Fig. 5 rotating in the direction indicated by the arrow 42 tends to set up a trailing stream of particles.

In the embodiment of the invention shown in Fig. 2, the parts are identical with the parts of Fig. 1 except that the sloping bottom wall is solid to the lowermost point where a discharge opening 43 is provided in a sloping bottom wall 44 and there is no recirculation port provided. The discharge conduit 45 may lead to a feed chute 12 of a second reclamation unit 10' which may be identical to the unit 10' illustrated in Figure 2 with other parts as illustrated in Figure 1. The lower reclamation unit 10' is thus operated in tandem with the upper unit 10'. The second unit may be below the first unit as shown so that the partially scrubbed material may be delivered to the second unit by gravity, or other suitable means may be employed for transferring material from the first to the second reclamation unit.

In the embodiment of the invention shown in Fig. 3, the reclamation unit 10″ has a sloping bottom wall 44 which is identical to that shown in Fig. 2, but the discharge port 43 is provided with a suitable valve 46 which may be operated manually or in any other suitable manner. A recirculation port 47 is provided adjacent the discharge port 43 which is the same as that shown in Fig. 1, except that a suitable closure member 48 is provided which may be moved to the dotted position shown at 48a to open the recirculation port 47. In this embodiment, therefore, the material may be recirculated for as many scrubbing operations as desired as a batch. The discharge opening 47 may then be closed by the closure 48 and the valve 46 opened to discharge the scrubbed material into any suitable receptacle.

It will thus be seen that an apparatus according to this invention could be operated in tandem, with one or more units, thus increasing the output and improving the average retention time, and hence the uniformity of the sand quality.

On the other hand, it is also possible to operate the apparatus as a bath unit by charging a certain amount of sand into the unit, and by opening the discharge valve 46 after a certain elapsed time cycle, and then recharging the apparatus with a second batch.

It will be understood that modifications and variations may be effected without departing from the scope of the novel concepts of the present invention.

I claim as my invention:

The method of treating granular foundry material to prepare the same for reuse in a molding operation, which comprises centrifugally throwing said granular foundry material in a generally horizontal stream from a central region outwardly against a surrounding rigid target with sufficient velocity to remove foreign matter adhering to the granular material without comminuting the granular material itself, said granular material falling from said target by gravity downwardly in an annular curtain surrounding said central region, feeding and directing air under pressure horizontally through said curtain of falling granular material to remove foreign matter from the falling curtain of granular material and causing said air to flow upwardly through asid centrifugally thrown generally horizontal stream of granular material to effect a preliminary scouring of the centrifugally thrown horizontal stream of granular material by collision of the granular material with the foreign matter carried by the upwardly flowing air stream, and separately removing the treated granular material and the foreign matter.

References Cited in the file of this patent

UNITED STATES PATENTS

| Number | Name | Date |
|---|---|---|
| 1,098,349 | Hazer | May 26, 1914 |
| 1,114,619 | James | Oct. 20, 1914 |
| 1,135,795 | Hiller | Apr. 13, 1915 |
| 2,012,694 | Runyan | Aug. 27, 1935 |
| 2,309,036 | Beardsley | Jan. 19, 1943 |
| 2,441,724 | Simpson | May 18, 1948 |
| 2,478,461 | Connolly | Aug. 9, 1949 |
| 2,516,161 | Talboys | July 25, 1950 |
| 2,553,234 | Boucher | May 15, 1951 |

FOREIGN PATENTS

| Number | Country | Date |
|---|---|---|
| 376,760 | Great Britain | July 5, 1932 |